UNITED STATES PATENT OFFICE.

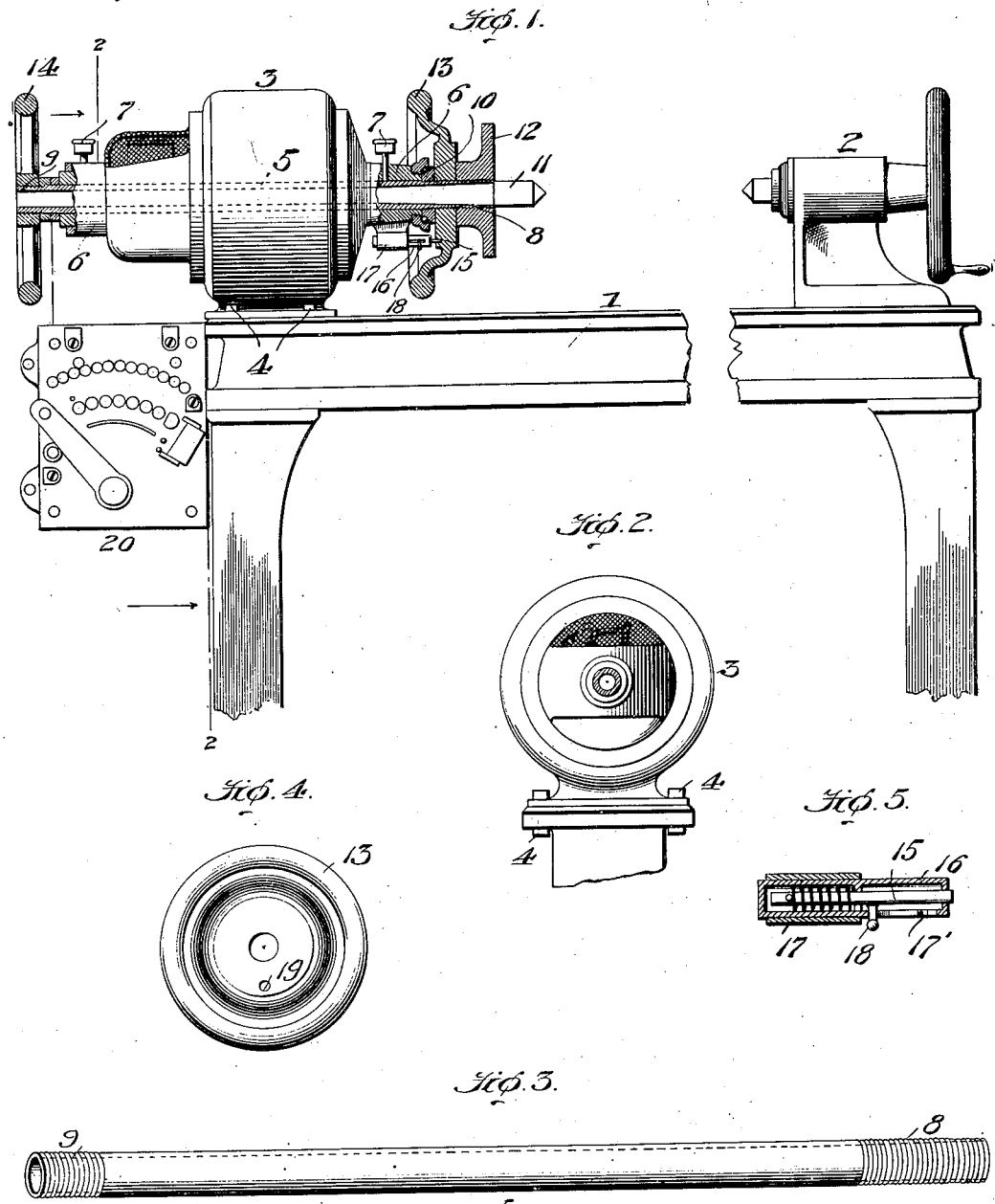

HARRY B. WHITE AND PERRY E. MEDFORD, OF WASHINGTON, DISTRICT OF COLUMBIA.

LATHE HEAD-STOCK.

938,030.

Specification of Letters Patent.

Patented Oct. 26, 1909.

Application filed March 26, 1908. Serial No. 423,328.

*To all whom it may concern:*

Be it known that we, HARRY B. WHITE and PERRY E. MEDFORD, citizens of the United States, residing at Washington, District of Columbia, have invented certain new and useful Improvements in Lathe Head-Stocks, of which the following is a specification.

Our invention relates to lathe head-stocks.
The ordinary wood turning lathe has a head-stock provided with a spindle and a cone pulley adapted to be belted to a countershaft. With such a construction, there is constant loss of power by belt transmission, expense of installation and maintenance, liability of slipping and looseness of the belt, requiring tightening from time to time, difficulty in slipping the belt from one step of the cone pulley to another when a change in speed is desired, and various other drawbacks. The ordinary wood turning speed lathe is also inefficient in that the hand of the user has to be placed upon the cone pulley when it is desired to rotate the spindle by hand, check its rotation, or hold it when applying or removing a face plate or chuck, etc., thus endangering the workman's hand because liable to be caught by the pulley, although in certain lathes it has been proposed to provide a hand wheel at the outer end of the spindle beyond the head-stock but such a wheel is not conveniently disposed to be grasped by the hand.

It has heretofore been proposed to drive an engine or metal turning lathe by an electric motor which in certain instances has been belted to the lathe spindle and in other instances connected thereto by gears but both constructions are deficient, the belt driven arrangement being subject to the defects heretofore pointed out and adding to the weight of the lathe because the usual head-stock is employed, while the gear driven arrangement also adds the weight of the motor to the head-stock and increases the space occupied by the lathe, and neither arrangement is adapted for high speed service such as is required of a wood turning lathe.

The object of our invention is the provision of an electric motor head-stock for lathes wherein the lathe spindle will carry the armature for the electric motor associated with a suitable rheostat by which the electric current for the motor may be regulated quickly and easily to cause increase or decrease of rate of rotation of the spindle and in providing such a structure to entirely dispense with the usual head-stock for speed lathes and all belting, so that the usual shafting may be entirely dispensed with. In carrying out this object of our invention any suitable electric motor and rheostat may be employed and the rheostat arranged at any suitable or convenient point but we prefer to employ it at the head-stock end of the lathe.

Another object of the invention is the provision of a hand wheel arranged on the spindle where the lathe center enters said spindle, thus affording a device which serves as lock nut for the spindle and which can be readily grasped by the workman when he desires to turn the spindle by hand or to hold it while performing any operation such as screwing or unscrewing a face plate, chuck, or the like; a further object being to provide means for securing the hand wheel when the workman has occasion to use both of his hands and desires to have the spindle locked.

In the accompanying drawings:—Figure 1 is a side elevation of a speed lathe, certain parts being broken away and shown in section, provided with our electric motor head-stock, hand-wheel, and locking device; Fig. 2, a section on line 2—2 of Fig. 1; Fig. 3, a detail of the spindle; Fig. 4, a detail face view of the hand wheel; and Fig. 5, a horizontal detail section of the locking device.

The bed of an ordinary speed lathe is shown at 1, having the usual tail-stock 2.

In substitution for the usual head-stock, we provide a variable speed electric motor 3 of any preferred construction which may be suitably bolted at 4, or otherwise, to the bed 1. The spindle 5 is journaled in suitable bearings 6, having oil cups 7, and directly carries the armature of the electric motor 3. The spindle 5 has screw-threaded ends 8 and 9. Preferably a suitable ball-bearing 10 is provided to receive the outer end thrust of the spindle, such ball-bearing being conveniently formed of a cone threaded on to the part 8 and a ball cup threaded on to the bearing 6, with interposed balls. The threaded end 8 receives the usual center 11 and is adapted for screwing thereon of the usual face-plate 12. We also provide a hand-wheel 13 of suitable construction, preferably solid and of the shape shown, (Figs. 1 and 4) which is screwed on to the part 8 against the ball cone thus acting as a lock nut for the spindle, with the face plate 12 abutting said hand-wheel. This hand-wheel is conveniently disposed to be grasped by the workman whenever he desires to turn the spindle by hand, or temporarily hold it and obviates the necessity of reaching to the far end of the spindle to grasp the ordinary hand-wheel 14 which is screwed on to the threaded end 9 but as it is frequently desirable to have the use of both hands, we provide a suitable locking device for securing the hand-wheel 13 and the spindle against rotation when desired as, for instance, when screwing or unscrewing the face plate 12. A convenient locking device is that shown in Fig. 5 comprising a spring retracted bolt 15 working in a tube or barrel 16 which is suitably secured in the bracket 17 projecting from the bearing 6. The spring tends to retract the bolt 15 out of engagement with the hand-wheel 13 but a notch 17' is provided in the barrel 16 to receive a finger 18 on the bolt to hold the end of the bolt projecting into a hole 19, of which there may be one or more, provided in the face of the hand-wheel.

A suitable variable speed rheostat 20 is secured to the lathe bed in any suitable position, or otherwise disposed, and is used for controlling the electric motor 3. With the rheostat, the workman has the speed of the lathe spindle under instant control and may at any time increase or diminish the speed and maintain it at any desired rate.

Our invention, in so far as the drive is concerned, is distinguished from electric motor driven head-stocks known to the art in that we have provided a complete electric motor head-stock instead of electrically driving the spindle of the ordinary head-stock.

Having thus described our invention, what we claim as new and desire to secure by Letters Patent, is:—

1. A self-contained electric motor head stock for lathes, comprising an electric motor mounted on the lathe bed, a lathe spindle carrying the rotatable element of the motor, and a hand-wheel carried by the inner end portion of the lathe spindle outside the head stock and adjacent the work-engaging means thereof.

2. A self-contained electric motor head stock for lathes, comprising an electric motor mounted on the lathe bed, a lathe spindle carrying the rotatable element of the motor, a hand-wheel carried by and rotatable with the lathe spindle adjacent the work-engaging means thereof, and stationarily positioned means located out of the path of rotation of the work adapted for locking said spindle.

3. A self-contained electric motor head stock for lathes, comprising an electric motor mounted on the lathe bed, a lathe spindle carrying the rotatable element of the motor, a hand-wheel carried by and rotatable with the inner end portion of the lathe spindle adjacent the work-engaging means thereof, and stationarily positioned means located out of the path of rotation of the work for locking said spindle.

4. In a lathe head stock, the combination with the lathe spindle, and work-engaging means carried thereby, of means located out of the path of rotation of the work adapted for locking said spindle against rotation.

5. In a lathe head stock, the combination with the lathe spindle, of a hand-wheel carried by the spindle and located outside said head-stock adjacent the work engaging means.

In testimony whereof, we hereunto affix our signatures in presence of two witnesses.

HARRY B. WHITE.
PERRY E. MEDFORD.

Witnesses:
M. LOUISE NEWCOMB,
ROLAND C. BOOTH.